United States Patent
McBrearty

(10) Patent No.: US 9,043,283 B2
(45) Date of Patent: May 26, 2015

(54) OPPORTUNISTIC DATABASE DUPLEX OPERATIONS

(75) Inventor: Gerald F. McBrearty, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 762 days.

(21) Appl. No.: 13/286,964

(22) Filed: Nov. 1, 2011

(65) Prior Publication Data

US 2013/0110782 A1 May 2, 2013

(51) Int. Cl.
*G06F 17/30* (2006.01)

(52) U.S. Cl.
CPC ................ *G06F 17/30578* (2013.01)

(58) Field of Classification Search
CPC ............ G06F 11/2007; G06F 11/2071; G06F 11/2074; G06F 11/2082
See application file for complete search history.

(56) References Cited

U.S. PATENT DOCUMENTS

| | | | | |
|---|---|---|---|---|
| 5,398,331 | A | * | 3/1995 | Huang et al. ................ 714/12 |
| 5,446,871 | A | | 8/1995 | Shomler et al. |
| 7,562,103 | B2 | * | 7/2009 | Kawamura et al. ............. 1/1 |
| 7,836,014 | B2 | | 11/2010 | Banks et al. |
| 7,890,461 | B2 | | 2/2011 | Oeda et al. |
| 2005/0027737 | A1 | * | 2/2005 | Micka et al. ............ 707/104.1 |
| 2010/0088287 | A1 | * | 4/2010 | Taniguchi ................ 707/672 |
| 2011/0066592 | A1 | | 3/2011 | Newport et al. |
| 2011/0072104 | A2 | | 3/2011 | Wayda et al. |

* cited by examiner

*Primary Examiner* — Sangwoo Ahn
(74) *Attorney, Agent, or Firm* — Terrile, Cannatti, Chambers & Holland, LLP; Robert W. Holland

(57) ABSTRACT

Database updates to primary and secondary database structures are performed by writing information from a client to both primary and secondary database services and building the database structure at the primary database service while delaying application of data written to the secondary database service until notification at the secondary database service from the primary database service. The primary database service provides notification upon completing the database structure so that the secondary database service can proceed with building the database structure from the information provided by the client or with information provided by the primary database service.

17 Claims, 2 Drawing Sheets

OPPORTUNISTIC DATABASE DUPLEX OPERATIONS

BACKGROUND OF THE INVENTION

1. Field of the Invention

The present invention relates in general to the field of database storage of information, and more particularly to an opportunistic database duplex operations.

2. Description of the Related Art

Redundancy for storage of information in a network cluster database is provided by duplexing information of a client for storage at a primary and a secondary database service. The pureScale database available from IBM has an application managed duplexing that writes a pureScale database structure from a client to two different database service provides. The client database application uses Remote Direct Memory Access (RDMA) to send and receive application data directly through a network interface with direct memory accesses that avoid delays introduced by operating system manipulation of data. One RDMA model issues a send/receive by a client to a server and another RDMA model uses server polling with a server responding to a request from a client pulling data from the client. For example, with one type of pureScale database, an appliance of a service provider node responds to a client request to modify the database structure by reading information to be written from the client node with RDMA and then transferring the information to the database service structure. The server and client interface may use standard socket protocols when transaction times are not critical.

Two conventional schemes exist for duplexing information in a database: "parallel write" duplexing and "store and forward" duplexing. Parallel write duplexing issues two write requests, one to each of two database services, so that the writes occur in parallel. Store and forward writes complete the write to the primary service and then use the primary service to write the secondary service. An advantage of parallel write duplexing is that a write in the parallel model finishes at about the same time for both database services that are receiving the information from the client. An advantage of store and forward writes is that duplexing does not depend upon all clients being able to reach the secondary service at all times. A difficulty with parallel write duplexing is that meta data between the two services must be synchronized if any issues arise during the processing of the information on either service, such as a failure to receive the data at a service because of a network failure. If the secondary service gets partitioned and not reachable by a single client, duplexing is lost and the secondary database structure must be re-built from the primary database structure. The status of a write to a database service and the duplexed state depend on both write streams. If one write fails and one succeeds, duplexing is broken and data redundancy fails until both service database structures are built. To rebuild the failed structure, a determination has to be made of whether the primary structure should remain as the primary to rebuild the secondary structure or the secondary structure should promote to be the primary structure to re-build the intended primary structure. A difficulty with store and forward duplexing is that write time doubles for a synchronous write, once to the primary service and once to the secondary service.

SUMMARY OF THE INVENTION

Therefore, a system and method is provided which reduces the time needed to complete duplexing of information between database services without full accessibility to secondary nodes through the duplexing operation.

In accordance with the present invention, a system and method are provided which substantially reduce the disadvantages and problems associated with previous methods and systems for duplexing information writes between database services. A client writes information to both a primary and secondary database service structure, however, the secondary database service structure delays action on the information copied from the client until a predetermined condition. The primary database service applies the information to implant the information in a database structure and notifies the secondary database service to complete the database structure at the secondary database service. Each database service might contain multiple structures where the primary server may be different for each structure.

More specifically, a cluster of computing nodes includes clients that generate and use information and a database that stores the information with plural database services. A client node has a processor and memory that executes a database agent for interacting with a primary and secondary database service through a network. The database agent issues a write of information to the primary and secondary database service to copy the information to the primary and secondary database services. The primary database service applies the information to build a database structure and then issues a write of the information from the primary database service to the secondary database service. The secondary database service delays action on information copied from the client until the write is received from the primary database service. In response to the write from the primary database service, the secondary database service determines if the information copied correctly from the client and, if so, applies the information to build the database structure. If the information did not copy correctly from the client, the secondary database service obtains a copy of the information from the primary database service to build the database structure. The primary and secondary database services determine their status with meta data of the information or with a transaction identifier included with the information.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Figure 1:
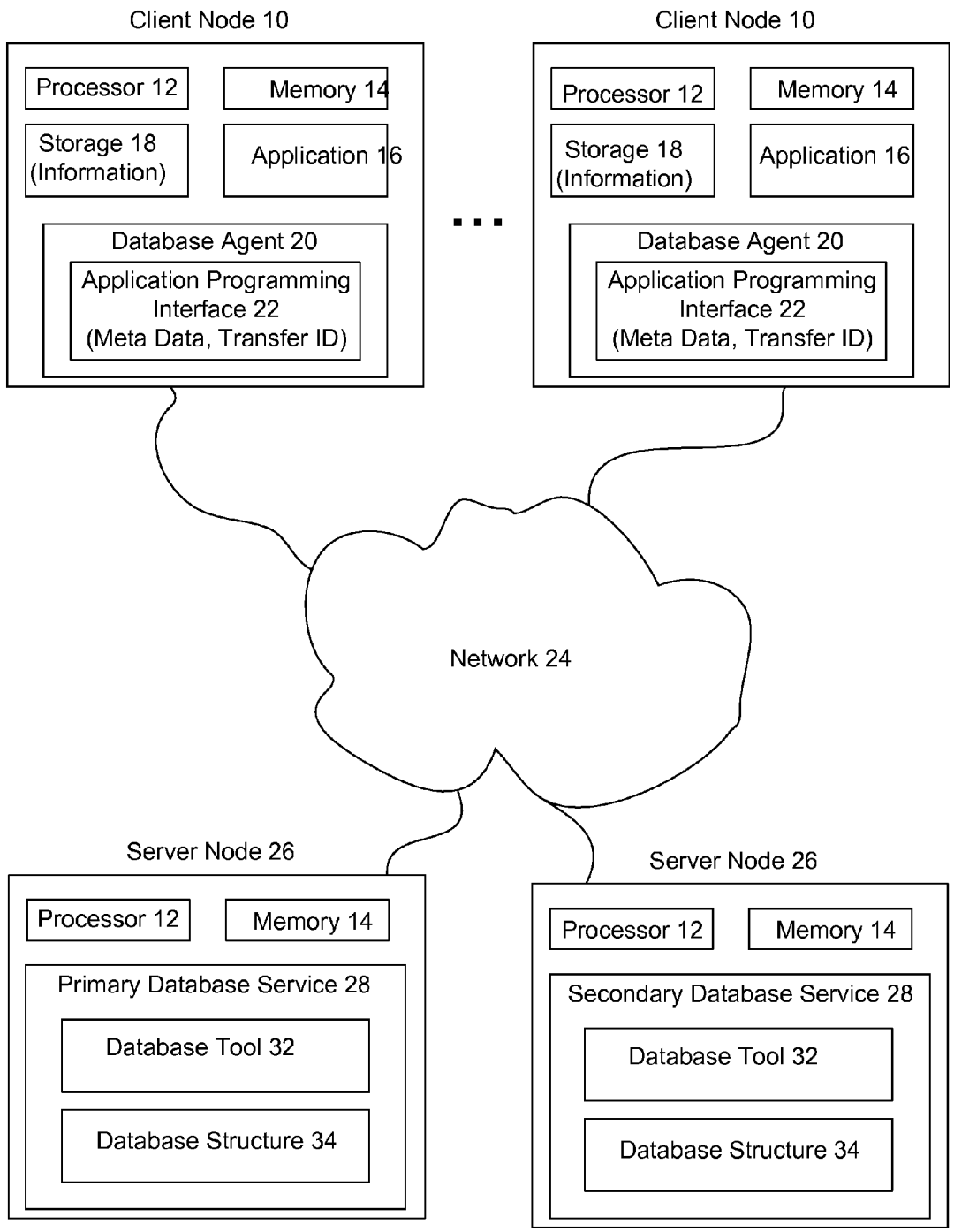
FIG. 1 depicts a block diagram of computing nodes interfaced through a network to save information in a database having primary and secondary services.

A system and method provides database services to clients using a parallel write model for more rapid copying of information from a client to primary and secondary database services, and a store and forward model to implant a database structure at the secondary database service using information copied from the client. A client agent application programming interface writes information to both the primary and secondary database services at the same time. The primary database service responds to the write by pulling the information from the client and then applying the information to build a database structure for implantation to the primary database. The secondary database service responds to the write by pulling the information from the client and storing the information without building the database structure. When the primary database service completes local processing of a write, it issues a write of the information to the secondary database service. If the secondary database service has already pulled the information from the client, then the secondary database service responds to the write from the primary database service by applying the information copied from the client to build the database structure. If the secondary database service does not have the information from the client, then it copies the information from the primary database service to build the database structure. This approach takes advantage of the speed provided by a parallel write algorithm when clients are connected to both services but maintains duplexing when the connection between some clients and the secondary database service are down. Since the secondary database service waits for a write from the primary database service, no advanced logic is needed to synchronize data or meta data should one of the services fail part of the operation because the write operation fails if the primary write fails. However, duplexing is not broken unless the communication connection between the primary and secondary database services is broken.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon. Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Referring now to FIG. 1, a block diagram depicts computing nodes interfaced through a network to save information in a database having primary and secondary services. Each of plural client computing nodes 10 processes information with a processor 12 and memory 14, such as by executing instructions of an application 16 that generates information stored in a storage device 18. Client nodes 10 have a database agent 20 with an application programming interface (API) 22 that supports database storage of information through a network 24 at one or more of plural server nodes 26. Database agent 20 issues "writes" of information by using RDMA to send and receive data with database services supported by server nodes 26. A database service receives a "write" from a client node 10 to modify a database structure and, in response, the database service reads the information to be written from the client node 10 and transfers the information to the database service structure.

In order to maintain redundancy of information, database agent 20 simultaneously issues write information to both a primary database service 28 and a secondary database service 30. Database tools 32 having instructions that run on a processor 12 and memory 14 of the server nodes 26 respond to write requests from database agents 20 of client nodes 10 to copy information from the client nodes. Database agent 20 of a client node 10 includes an indicator with information to be written so that database tool 32 can determine its status as a primary database service 28 or secondary database service 30. For example, API 22 issues a primary write to the primary database service 28 and a secondary write to the secondary database service 30 so that each database service retrieves the information to be written from the client node 10. In one embodiment, the writes include a transaction identifier generated by API 22 that the primary and secondary database services use to coordinate the writes. The transaction identifier is only valid for a single request between duplexed primary and secondary database services and aids in each database service assuming appropriate primary and secondary roles. The transaction identifier supports implantation of data into the primary or secondary database service with the same meta data or with a primary meta data included in information provided the primary database service 28 and secondary meta data included in information provided to secondary database service 30. The transaction identifier or other indicators provide the secondary database service 30 with notification of its status as secondary service so that the secondary database service 30 can operate with the same meta data as the primary database service 28 or with different meta data.

Once a write from a client node 10 initiates a copy of information to both primary database service 28 and secondary database service 30, primary database service 28 responds to the write by retrieving the information from client node 10 and applies the information to implant the information in database structure 34. Secondary database service 30 also retrieves the information from client node 10, however, secondary database service 30 saves the information without building a database structure to implant in database structure 34. Once primary database service 28 completes local processing to update primary database structure 34, database tool 32 of primary database service 28 issues a write to secondary database service 30, similar to a write that would issue in the store and forward model of duplexing. Database tool 32 of secondary database service 30 responds to the write from primary database service 28 by first attempting to create the database structure from the information already copied from client node 10. If the information copied from client node 10 is complete and successfully implants in data structure 34, then secondary database service 30 does not have to retrieve information from primary database service 28 to complete the write. If implantation of information copied from client node 10 is unsuccessful, then secondary database service 30 retrieves the information from primary database service 28 to update database structure 34. In one embodiment, database tool 32 of secondary database service 30 will delay retrieving information from primary database service 28 if additional time is needed to complete copying of information from client node 10. If the write to primary database service 28 fails, then the implantation of the information at secondary database service 30 is not performed, thus eliminating the need for advanced logic that synchronizes information and meta data in the event of a failure at primary data service 28.

Figure 2:
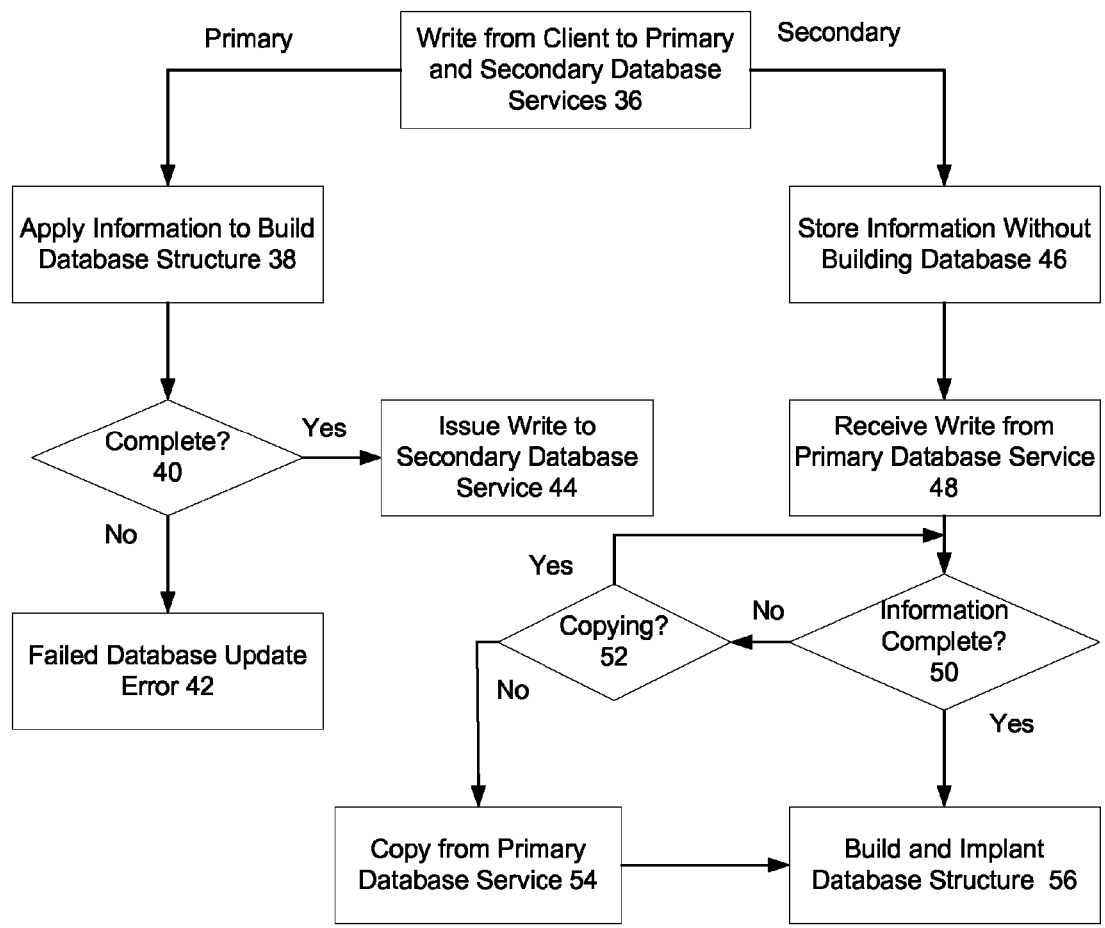
FIG. 2 depicts a flow diagram of a process for saving information of a client node to primary and secondary database services.

Referring now to FIG. 2, a flow diagram depicts a process for saving information of a client node to primary and secondary database services. The process begins at step 36 with issuance of a write command from a client to a primary database service and a secondary database service. The primary database service receives the write command at step 38 to retrieve information from the client and apply the information to build a database structure for implantation at the primary database service. At step 40, the primary database service completes local processing to update a primary database with the information from the client and determines if the update is complete. If the implantation of the client information to the primary database structure does not complete, the process continues to step 42 to end without attempting to implant the information at the secondary database service. If at step 40 a determination is made that the primary database has correctly updated the database structure from the client, then at step 44 the primary database service issues a write command to write the information from the primary database service to the secondary database service.

At step 36, the write from the client to the secondary database service initiates copying of the information from the client to the secondary database service. At step 46, the information from the client is stored at the secondary database service without action taken to implant the information to the secondary database. The secondary database service waits to apply the information to build a database structure until the write issued from the primary database service at step 44 arrives at the secondary database service and is detected at step 48. At step 50, the secondary database service responds to the write command from the primary database service by determining if the information copied from the client to the secondary database service is complete and correct. If the information is not complete and correct, the process continues to step 52 to determine if the information is still in the process of copying to the secondary database service from the client. If copying is continuing at step 52 the process returns to step 50 to allow some additional time to complete copying of information from the client. If at step 52 a determination is made that the client is not copying information or has copied information incorrectly, then the process continues to step 54 to copy the information from the primary database to the secondary database. At step 56, the secondary database builds the database structure for the information to update the secondary database. The update to the database structure is performed with the information copied from the client as determined by step 50 or with the information copied from the primary database service at step 54 if the information did not correctly and completely copy from the client to the secondary database service.

In one alternative embodiment, the secondary database service receives a copy of information from the client and then checks with the primary database service to determine if a write command will arrive. If not, the secondary database service can discard the copy of information or, alternatively, can send a copy of the data to the primary database service to allow the primary database service to build and implant the database structure and then issue the write command. Similarly, the secondary database service can instruct the primary database service regarding the client write so that the primary database service contacts the client to obtain a copy of the information from the client. As another alternative, the secondary database service can elect itself to be the primary database service.

Although the present invention has been described in detail, it should be understood that various changes, substitutions and alterations can be made hereto without departing from the spirit and scope of the invention as defined by the appended claims.

What is claimed is:

1. A method for duplexing a write of data from a client to primary and secondary database services, the method comprising:
   issuing a primary write from a client to a primary database service;
   issuing a secondary write from the client to a secondary database service, the secondary write issued simultaneously with the primary write;
   in response to the issuing a primary write, copying the data to the primary database service and applying the data to build a database structure at the primary database service;
   in response to the issuing a secondary write, copying the data to the secondary database service and waiting for a predetermined condition before building a database structure at the secondary database service;
   issuing a write of the data from the primary database service to the secondary database service upon building of the database structure at the primary database service; and
   in response to issuing a write from the primary database service to the secondary database service, building the database structure at the secondary database service with the data copied from the client instead of copying the data from the primary database service.

2. The method of claim 1 wherein the predetermined condition comprises receiving the write from the primary database service at the secondary database service, the method further comprising building the database structure at the secondary database service in response to the receiving the write.

3. The method of claim 2 wherein the issuing a write of the data from the primary database service further comprises issuing the write to the secondary database service after completing the database structure at the primary database service.

4. The method of claim 2 wherein building the database structure at the secondary database service further comprises:
   in response to the receiving the write from the primary database service, determining that the data copied from the client to the secondary database service; and
   in response to the determining, applying the data at the secondary database service to build the database structure at the secondary database 5. The method of claim 2 wherein building the database structure at the secondary database service further comprises:
   in response to receiving the write from the primary database service, determining that the data is currently copying from the client to the secondary database service; and
   in response to the determining, waiting for the data to complete copying from the client to the secondary database service and then applying the data at the secondary database service to build the database structure at the secondary database service.

6. The method of claim 2 wherein building the database structure at the secondary database service further comprises:
   in response to receiving the write from the primary database service, determining that the data failed to accurately copy from the client to the secondary database service; and
   in response to the determining, issuing a write from the primary database service to the secondary database service to build the database structure at the secondary database service from data of the primary database service.

7. The method of claim 1 further comprising:
   including a primary transaction identifier with the primary write; and
   referencing the primary transaction identifier at the primary database service to issue the write from the primary database service to the secondary database service.

8. The method of claim 1 further comprising:
   including a secondary transaction identifier with the secondary write; and
   referencing the secondary transaction identifier at the secondary database service to determine to wait for the predetermined condition before building the database structure at the secondary database service.

9. The method of claim 8 wherein the data write to the primary and secondary database services includes common meta data, the secondary database service applying the secondary transaction identifier and meta data to build the database structure at the secondary database service.

10. The method of claim 1 wherein the data copied to the primary database service includes primary meta data and the data copied to the secondary database service includes secondary meta data.

11. A system for storing information in database, the system comprising:
   a client node having a processor and memory;
   a database agent stored in the client node memory and configured to execute on the client node processor to parallel write information to a primary database service and a secondary database service;
   a primary database service configured to receive the information and apply the information to build a database structure; and
   a secondary database service configured to receive the information and store the information without applying the information to update a database structure until a predetermined condition, the secondary database service applying the information to build the database structure with meta data received from the primary database service, the meta data used to build the database structure at the primary database service,
   wherein the predetermined condition comprises a write of the information received at the secondary database service from the primary database service, and
   wherein the secondary database service is further configured to respond to a write of the information from the primary database by determining that the information copied correctly from the database agent and applying the information to build the database structure at the secondary database service without copying the information from the database structure at the primary database service.

12. The system of claim 11 wherein the primary database service is further configured to issue a write of the information to the secondary database service upon completing the build of the database structure.

13. The system of claim 11 wherein the secondary database service is further configured to respond to a write of information from the primary database service by determining the information failed to correctly copy from the database agent and in response to the determining copying the information from the primary database service and applying the information to build the database structure at the secondary database service.

14. The system of claim 11 wherein the database agent includes a transaction identifier with a copy of the information to the primary and secondary database services, the transaction identifier identifying the primary and secondary database services.

15. A database service comprising:
- a processor and memory configured to execute and store instructions; and
- instructions stored in the memory and configured to execute on the processor to:
- receive information from a database agent;
- analyze the information to determine a primary or secondary status;
- in response to the determining a secondary status, delaying applying the information to build a database structure until a predetermined condition; and
- in response to the predetermined condition, build the database structure based upon meta data received from a primary database service that received the information from the database agent and built a database structure for the information at the primary database service,
- wherein the predetermined condition comprises a write of the information from the primary database service, the instructions further configured to execute on the processor to respond to a write of the information from a primary database service by building the database structure with the information received from the database agent without copying the information from the primary database service.

16. The database service of claim 15 wherein the primary or secondary status is determined by a transaction identifier included with the information.

17. The database service of claim 15 wherein the primary or secondary status is determined by meta data included with the information.

* * * * *